United States Patent [19]

Isobe

[11] Patent Number: 4,812,914

[45] Date of Patent: Mar. 14, 1989

[54] ELECTRONIC PRINT BOARD APPARATUS

[75] Inventor: Minoru Isobe, Tokyo, Japan

[73] Assignee: Oki Electric Industry Co., Ltd., Tokyo, Japan

[21] Appl. No.: 212,224

[22] Filed: Jun. 27, 1988

[30] Foreign Application Priority Data

Dec. 27, 1985 [JP] Japan .................. 60-293052

[51] Int. Cl.$^4$ .................................. H04N 1/10
[52] U.S. Cl. ................. 358/293; 358/294; 358/285; 358/296
[58] Field of Search ............. 358/256, 285, 293, 294, 358/296; 434/428, 429, 430, 411

[56] References Cited

U.S. PATENT DOCUMENTS

| | | | |
|---|---|---|---|
| 2,354,199 | 7/1944 | Collins ........................ | 358/86 |
| 3,109,059 | 10/1963 | Kargl .......................... | 358/283 |
| 3,541,248 | 11/1970 | Young ......................... | 358/294 |
| 4,275,423 | 6/1981 | Takahashi et al. ............ | 358/285 |
| 4,587,568 | 5/1986 | Takayama .................... | 358/293 |
| 4,667,254 | 5/1987 | Araki et al. ................... | 358/293 |
| 4,670,794 | 6/1987 | Araki et al. ................... | 358/293 |
| 4,713,698 | 12/1987 | Takahashi et al. ............ | 358/296 |
| 4,725,889 | 2/1988 | Yamiv et al. ................. | 358/293 |
| 4,727,431 | 2/1988 | Nakamura et al. ........... | 358/285 |

FOREIGN PATENT DOCUMENTS 0119856 9/1984 European Pat. Off. .
1554718 1/1969 France .
60-7262 1/1985 Japan .

*Primary Examiner*—Edward L. Coles, Sr.
*Attorney, Agent, or Firm*—Wenderoth, Lind & Ponack

[57] ABSTRACT

An electronic print board apparatus optically reads characters and figures, etc., written on a plate surface to scale down and print them, and includes a writing unit, a frame, a scanning unit, and a printer. The writing unit is divided into two sections, each of which has a plurality of stacked writable flat plates, a writing surface being formed by a front row of the two sections. The writing surface can be changed by rotating and moving one flat plate of the two flat plates located in the front row to the position of the other flat plate. The scanning unit is supported movably on the frame and includes a drive for causing such movement, a read unit having a sensor for generating a read signal, a synchronization device for synchronizing the scanning by the read unit with the speed of movement of the scanning unit, a battery for supplying power, and a transmitter for transmitting the read signal. The scanning unit optically scans the writing surface and issues the read signal. The printer receives the red signal transmitted from the scanning unit and prints in conformity with such signal.

12 Claims, 8 Drawing Sheets

ELECTRONIC PRINT BOARD APPARATUS

This application is a continuation of now abandoned application Ser. No. 947,420, filed Dec. 24, 1986.

BACKGROUND OF THE INVENTION

1. Field of the Invention

The present invention relates to an electronic print board apparatus capable of printing or copying characters and figures, etc., written on a blackboard for use in conferences and meetings, etc., and more particularly to an electronic print board employing a movable scanner system for scanning the characters and the figures, etc., for reading them by permitting a read sensor to move with respect to the writing surface.

2. Description of the Prior Art

A prior electronic print board employed in conferences, meetings, and preliminary meetings, etc., is capable of scaling down characters, figures, etc., written on a blackboard, printing them, and distributing them to attendants on the spot. This board is disclosed in U.S. Pat. No. 4,587,568, and Application Ser. Nos. 739,460, 739,461, 768,819, 783,019, and 793,284.

Such electronic print board includes a writing surface on which a writer writes characters and figures, etc., an elongated lamp for illuminating the writing surface, a sensor for converting reflected light from the writing surface to an electric signal and scanning a pattern on a line of the writing surface, means for effecting the above one line scanning by the sensor over the entire writing surface, and a printer for scaling down characters and figures, etc., written on the writing surface and printing them in conformity with the electric signal provided from the sensor.

In addition, for the means for scanning the entire writing surface, two systems can be employed: one a sheet moving system and the other a scanner moving system.

In the sheet moving system, the writing surface is formed by a continuous sheet that is wound around a rotatable roller and thereby supported. The sheet is moved by rotating the roller and is scanned by a fixed sensor.

In the scanner moving system, the writing surface is formed by a board or plate, and a lamp and a sensor are mounted on a carrier that is movable along the board surface during which the surface is scanned by the sensor.

However, such prior electronic print boards suffer from the following problems:

(a) The sheet moving system, which requires a motor for rotating and driving a roller, a control unit for controlling the motor, and a power source, results in the apparatus being heavy and causes the apparatus to be large-sized, complicated, and costly, rather than a small-sized, lightweight, and low-priced apparatus, which is an object of a wall-mounted type electronic print board.

(b) The scanner moving system employs a motor to drive a scanning part such as the carrier, whereby the mechanism for driving the scanning part is large-sized and complicated. In addition, an electric control system is also complicated, while a power source unit serving to supply power thereto is also large-sized. As a result, the electronic print board apparatus inevitably is made large-scale and hence cannot be small-sized, lightweight, and low-priced.

(c) The scanner moving system is adapted to have a writing surface formed with a sheet or board, and thus cannot have a plurality of writing surfaces.

(d) An operating unit, a printing part, and many constituent elements included in the electric control system are housed in a casing located on the back or the side of the writing surface or suspended therefrom. Accordingly, the electronic print board becomes thick as a whole and large-sized, and thus is inappropriate as a wall-mounted system.

(e) The scanning unit, the electric control system housed in the casing, and an external power source are connected with each other via cables. Accordingly, the appearance of the apparatus as a wall-mounted system is injured by drawing around the cables.

BACKGROUND OF THE INVENTION

In view of the drawbacks of the prior techniques, it is an object of the present invention to provide an electronic print board which is small-sized, lightweight, low-priced, and of reduced power consumption.

Another object of the present invention is to provide an electronic print board capable of being mounted on a wall or being buried therein, thereby greatly increasing the freedom of installation and use.

Still another object of the present invention is to provide an electronic print board apparatus wherein cables for power supply from the outside of the electronic print board and signal delivery between it and a printing unit are eliminated, thereby improving the appearance of the apparatus.

Yet another object of the present invention is to provide an electronic print board apparatus capable of being employed as a mere blackboard unit by removing a scanning unit from the electronic print board, such blackboard unit being capable of preservation of writing or characters thereon for a long period of time while precluding the possibility of generation of heat and the production of fire.

Still a further object of the present invention is to provide an electronic board apparatus including a plurality of writing surfaces and being capable of manually selecting a desired writing surface with ease.

To achieve the above objects, an electronic print board apparatus according to the present invention includes a writing unit having a writable/erasable writing surface, a frame for housing and supporting the writing unit, a scanning unit movable supported on the frame for optically scanning the writing surface in a prescribed direction and to issue an electric signal indicative of read or scanned information, and a printing unit for printing the read information on a recording medium in conformity with the electric signal.

The writing unit is constructed by stacking a plurality of writable flat sheets or plates in two sections yielded by halving the interior of the frame. A selected writing surface is formed by two flat sheets positioned on a front or outer row of the two sections among the plurality of the flat sheets. The plurality of the flat sheets are movable from one to the other of the two sections by rotating around a boundary line or axis dividing the interior of the frame into the two sections when the flat sheets are located on the front row. The scanning unit includes an operating part to provide prescribed instruction, drive means for moving a scanning member in the prescribed direction over the writing surface, a read unit composed of a light source for illuminating the writing surface with light and a sensor for converting reflected light from the writing surface to an electric signal, means for synchronizing the scanning of the writing surface by the read unit with a moving speed of the scanning part, a battery for supplying power to respective constituent parts within the scanning unit, and means for transmitting the information read by the read unit, the printing part including means for receiving the information transmitted from the scanning unit.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
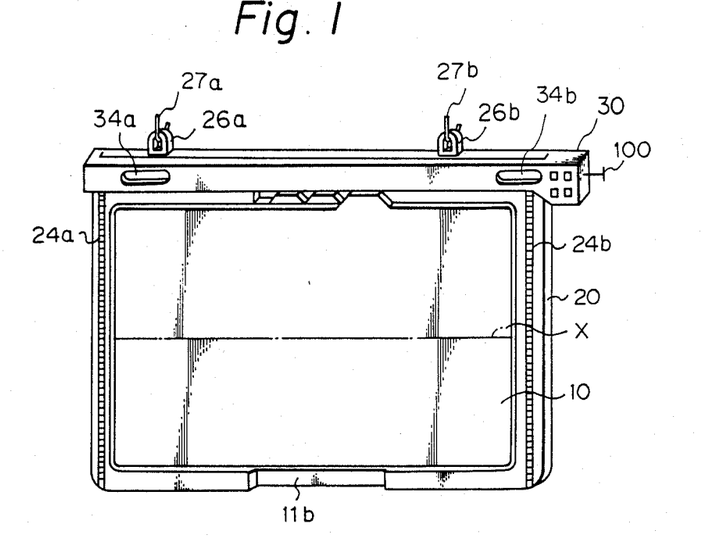
FIG. 1 is an elevation view illustrating an embodiment of an electronic print board according to the present invention.
Figure 2:
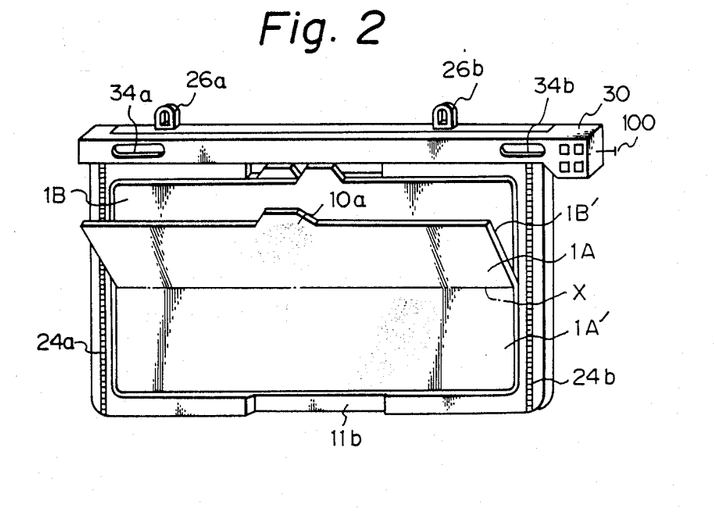
FIG. 2 is a similar view illustrating a changeover operation for a writing surface of the device shown in FIG. 1.

Referring to FIG. 1, the entire arrangement of an electronic print board apparatus according to the present invention essentially includes a multi-layer folding type writing unit 10 (hereinafter simply referred to as a writing unit), a frame 20, a scanning unit (scanner) 30, and a monitor printer described later. The writing unit 10 is housed in the rectangular frame 20 (these elements constitute a blackboard unit), and the scanning unit 30 is mounted vertically movably on the writing unit 10 in engagement with two opposite vertical end parts of the frame 20. The writing unit 10 has a plurality of flat plates rotatably movable about a horizontal axis X as shown in FIG. 2, the surfaces of the flat plates forming writing surfaces. Namely, one writing surface is formed by the writing surfaces 1A, 1A' provided by two flat plates, and a plurality of writing surfaces of this type are provided so as to be exchangeable with respect to each other.

Details of the apparatus are as follows.

Figure 5A:
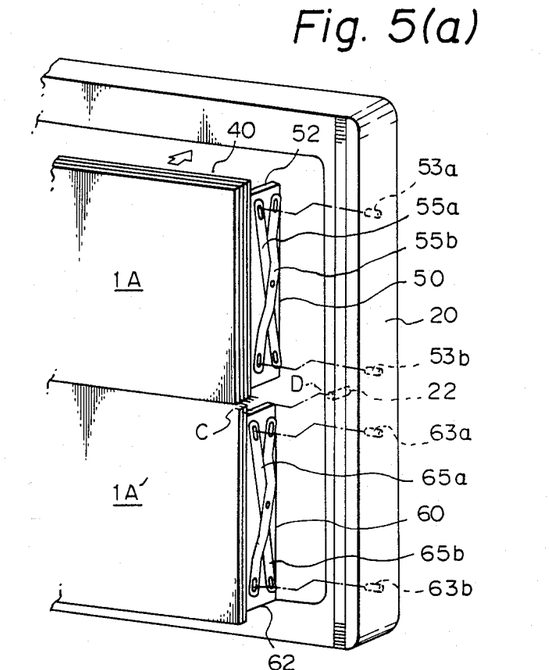
FIGS. 5(a) to 5(g) are partial views illustrating the arrangement of a writing unit having a writing surface capable of changeover shown in FIG. 1.
Figure 5B:
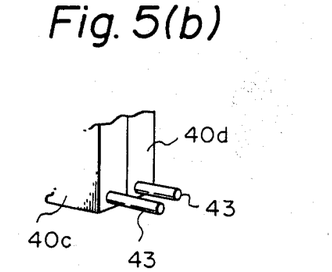
Figure 5C:
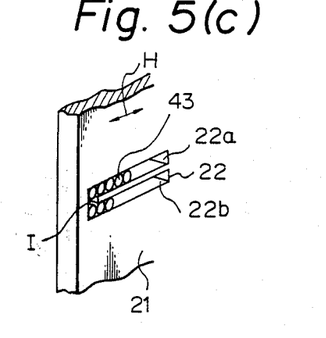
Figure 5D:
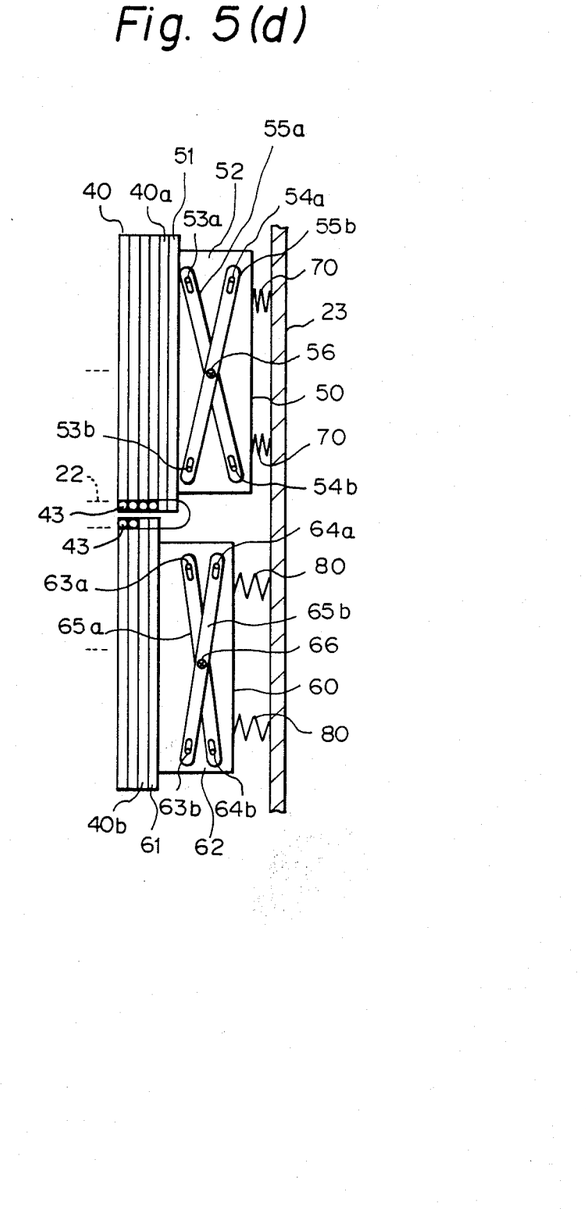
Figure 5E:
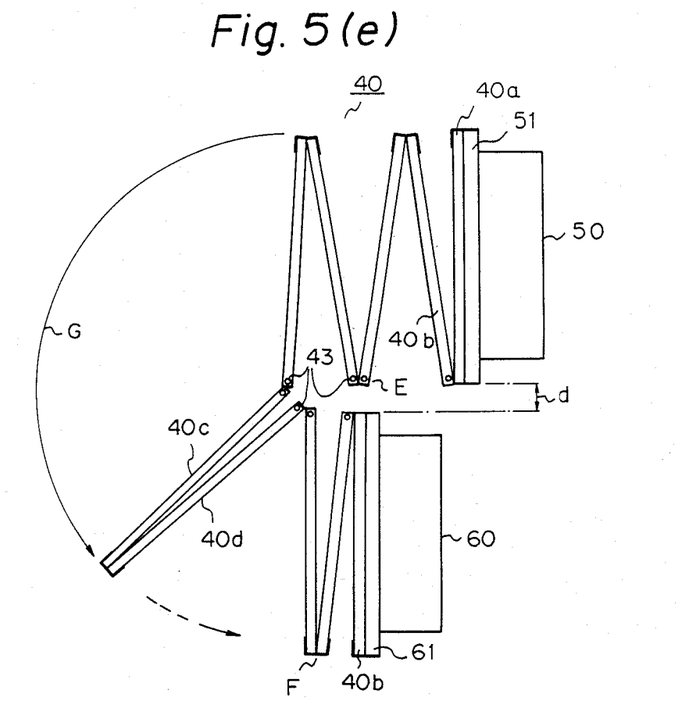

The writing unit 10 is arranged as shown in FIGS. 5(a) to 5(g). Although such figures primarily illustrate the right side of FIG. 1, the left side is arranged in the same manner. FIG. 5(a) is a view illustrating a relationship between the writing unit 10 and the frame 20, FIGS. 5(b) and 5(c) are detail views showing the vicinities or areas C and D in FIG. 5(a), FIG. 5(d) is a side view of the writing unit illustrating a holder of the writing unit (here, the flat plates are partly omitted), FIG. 5(e) is a side view of the writing unit illustrated as a stacked flat plate assembly, and FIGS. 5(f) and 59(g) respectively are detail views showing the vicinities of areas E and F in FIG. 5(e).

Figure 5F:
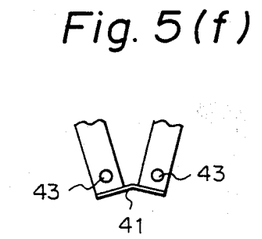
Figure 5G:
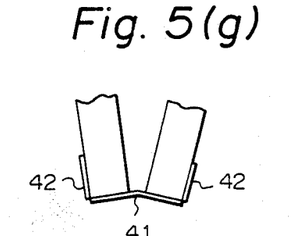

The writing unit 10 mainly includes a stacked flat plate assembly 40 composed of a plurality of coupled flat plates and holders 50, 60 for supporting the stacked flat plate assembly 40. In the stacked flat plate assembly 40, the flat plates are arranged in two vertically spaced stages in respective sections in the frame 20. As shown in FIGS. 5(d) and 5(e), the upper stage flat plates 40a are fixedly mounted on a back plate 51 fixedly mounted on a side plate 52 of the holder 50. Likewise, the lower stage flat plates 40b are fixedly mounted on a back plate 61 fixedly mounted on a side plate 62 of the holder 60. End surfaces of the adjoining flat plates of adjacent pairs of flat plates are joined with each other via joining members 41 treated to be writable, for connecting ends of the plates successively as shown in FIG. 5(f). A writable sheet magnet 42 as shown in FIG. 59(g) is provided on the end part of the flat plate moving in rotation in the direction of arrow G shown in FIG. 5(e). The magnet 42 magnetically couples the adjoining flat plates with each other when these plates are arranged as shown in FIG. 5(d). Although in the present embodiment the magnet is exposed directly on the plate surface, it may be buried in the plate and covered with a sheet. A horizontally extending cylindrical pivot 43 extends from the side surface of each plate and forms the center of rotational movement thereof, shown by the arrow G, except for the endmost flat plates 40a, 40b (FIGS. 5(b) and 5(e)). Each pivot 43 is engaged with a groove arrangement 22 formed in the inner wall 21 of the frame 20 as shown in FIG. 5(c), thereby holding each flat plate such that it is parallely movable in the direction of arrow H. The groove arrangement 22 has two vertically spaced grooves 22a, 22b, and the groove 22a houses the pivots 43 of the upper stage flat plate while the groove 22b houses the pivots 43 of the lower stage flat plate. In addition, a gap allowing the pivots 43 to pass therethrough are provided in end parts I between the grooves 22a, 22b on the writing surface end of the grooves to enable the flat plates to be movable from the upper stage to the lower stage or vice versa by rotational motion of the flat plates, as shown in FIG. 5(e). Moreover, the groove arrangement 22 may have a single groove instead of the two grooves 22a, 22b. In addition, although in FIGS. 5(a) and (e) the distance between the upper and lower stage pivots is shown at exaggerated size for simplicity of illustration, it is actually very small.

Figure 4:
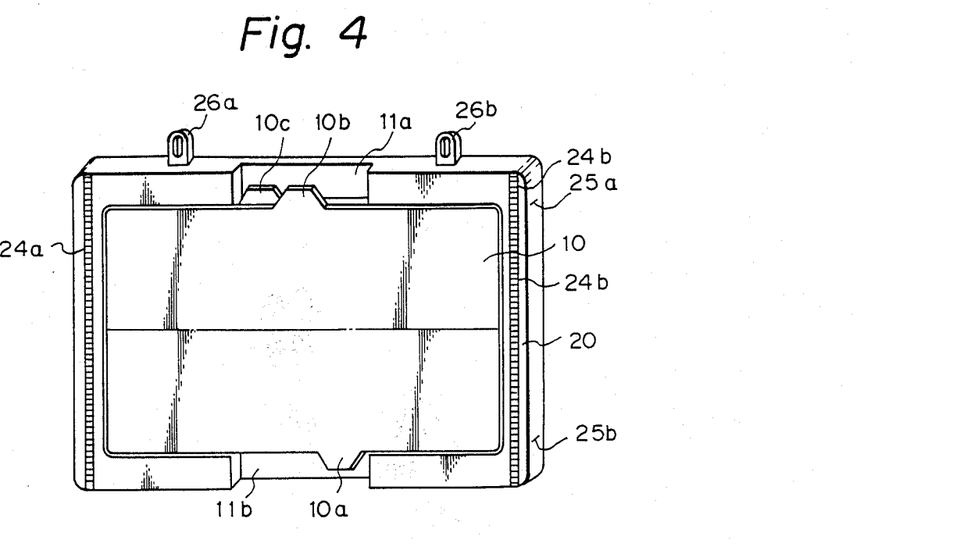
FIG. 4 is a similar view with the scanning unit of FIG. 1 removed.

In the stacked flat plate assembly 40 arranged as described above, the upper stage flat plates together with holder 50 are pushed outwardly to the writing surface by a spring 70 while the lower stage flat plates together with holder 60 are pushed outwardly to form the writing surface by a spring 80, as shown in FIG. 5(d). The holder 50 includes side plate 52, four pivots 53a, 53b, 54a, and 54b, two links 55a and 55b, and a pivot 56 for movably supporting links 55a and 55b. The pivots 54a and 54b are fixedly mounted on the side plate 52 while the pivots 53a and 53b are fixedly mounted on the inner wall 21 of the frame 20 as shown in FIG. 5(a). In addition, the pivots 53a and 54b are respectively engaged with two elongated holes in the link 55a while the pivots 53a and 54a respectively are engaged with two elongated holes in the link 55b. Likewise, the holder 60 includes side plate 62, four pivots 63a, 63b, 64a, and 64b, two links 65a and 65b, and a pivot 66 for supporting these links, and the pivots 64a and 64b are fixedly mounted on the side plate 62 while the pivots 63a and 63b are fixedly mounted on the inner wall 21 of the frame 20. Moreover, the pivots 63a and 64b are respectively engaged with two elongated holes in the link 65a while the pivots 63b and 64a respectively are engaged with two elongated holes in the link 65b. Since the stacked flat plate assembly 40 is pushed by the springs 70 and 80, the pivots of these flat plates are arranged in order from the edge of the groove arrangement 22 adjacent the writing surface side, i.e. the front side thereof as shown in FIG. 5(c). That is, the upper and lower two flat plates on the front side (i.e. flat plates having writing surfaces 1A and 1A' in the example shown in FIG. 2) are maintained in a planar and vertical alignment due to the pivots 43 of these first plates being urged into contact with the forward edges of the grooves of groove arrangement 22, thereby forming a single writing surface. The adjoining flat plates are mutually coupled by the sheet magnets 42 as described above. When it is desired to change to another writing surface, a pair of flat plates, such as the pair of flat plates 40c and 40d are rotated about their respective pivots 43 in the direction of arrow G shown in FIG. 5(e), thus easily changing the writing suface. Moreover, to promote this operation, hook portions 10a, 10b, and 10c as shown in FIG. 4 are provided on respective of the flat plates. To house these hook portions, concave recesses 11a and 11b are formed respectively in the upper and lower end parts of the frame 20. Moreover, a portion of each flat plate providing the writing surface is surface treated so as to permit data to be written thereon by means of an aqueous felt tipped pen. Alternatively, this can be achieved by sticking a writable sheet on the flat plate.

Figure 6A:
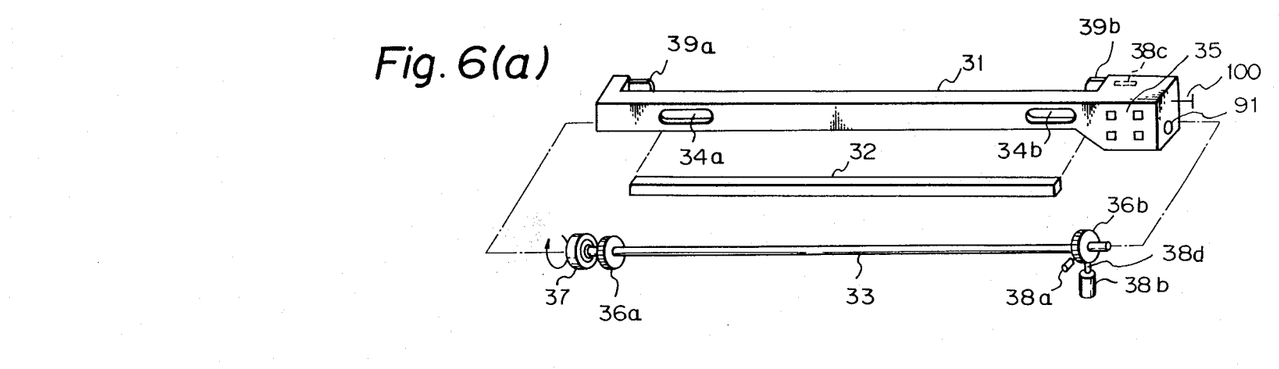
FIGS. 6(a) to 6(f) are views illustrating the arrangement of the scanning unit shown in FIG. 1.
Figure 6B:
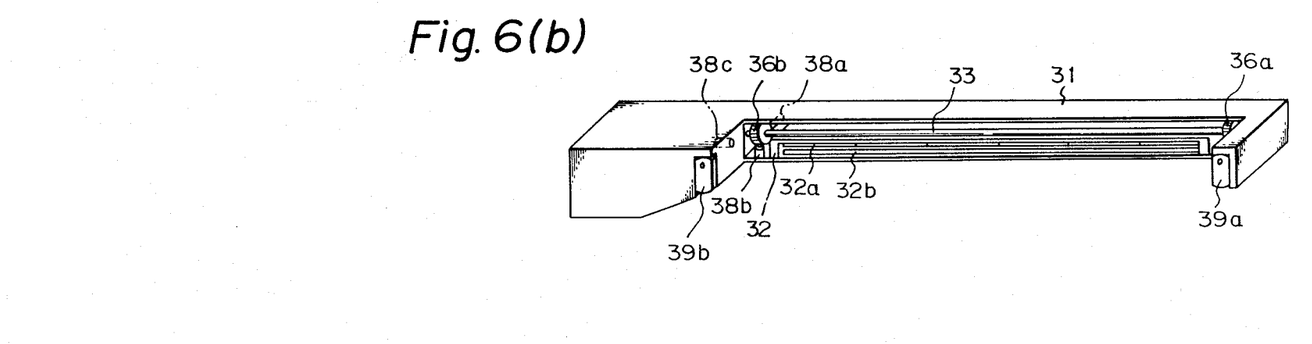
Figure 6C:
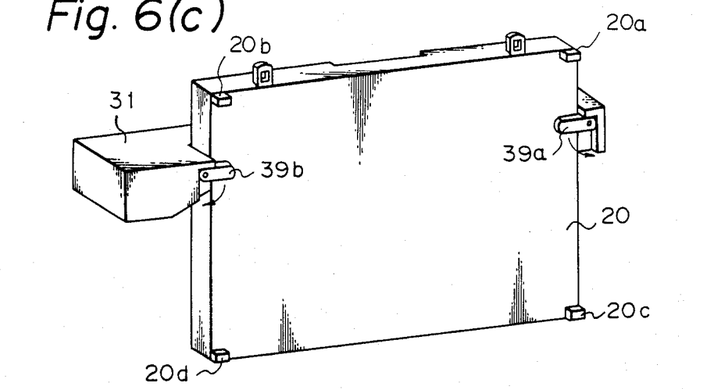

The arrangement of the scanning unit 30 now will be described. FIG. 6(a) is an exploded view illustrating a main portion of the scanning unit. FIG. 6(b) is a perspective view illustrating the scanning unit when viewed from the rear thereof. The scanning unit 30 includes, in a casing 31, a read unit 32 composed of a one-dimensional photoelectric conversion sensor 32a and a light source 32b, a synchronization shaft 33, and electric control system (now shown) for processing an electric signal from the read unit 32, and a chargeable battery (not shown). The casing 31 has handgrip holes 34a and 34b in the front part thereof, and has an operating part 35 including respective switches for providing instructions such as "power on", "monitor on", "number of copies set", and "start". Gears 36a and 36b are provided at opposite ends of the shaft 33. These gears are respectively engaged with rack teeth 24a and 24b extending vertically on the side front surfaces of the frame 20 (FIGS. 1 and 2). A spiral spring 37 is attached to one end of the synchronization shaft 33 and biases the gears 36a and 36b provided on opposite ends of the synchronization shaft 33 into engagement with the rack teeth 24a and 24b of the frame 20 so as to permit the scanning unit 30 to move upwardly on the frame 20, i.e. in the direction of the arrow in FIG. 6(a). A timing sensor 38a is provided in the vicinity of one gear 36b to provide a timing read scan. Moreover, a solenoid 38b is provided for preventing the gear 36b from being rotated by engaging a stopper 38d with the gear 36b tooth when the apparatus is not operated. In addition, a mark sensor 38c is provided in the casing 31 for optically reading an end mark 25a and a start mark 25b marked on the side of the frame 20 as shown in FIG. 4. Furthermore, rotatble guide plates 39a, 39b are provided on respective opposite ends of the casing 31 on the rear side thereof. These guide plates 39a, 39b make contact with the back surface of the frame 20 to hold the frame 20 between the guide plates and the casing 31, thereby preventing the scanning unit 30 from being dismounted from the frame 20. Guide plates 39a, 39b are prevented, upon the upward movement of the scanning unit 30 from slipping upwardly from the frame 20 by striking respective projections 20a, 20b provided on opposite upper ends of the frame 20, as shown in FIG. 6(c). Moreover, guide plates 39a, 39b limit downward movement of the scanning unit 30 by striking projections 20c, 20d provided on opposite lower ends of the frame 20. The scanning unit 30 easily can be removed from the frame 20 by rotating the guide plates 39a, 39b into the positions shown in FIG. 6(b). In addition, an antenna 100 is attached to one side of the casing 31. The antenna 100 enables communication between the electric control system in the scanning unit 30 and a monitor printer, described below, via an electric wave.

Figure 6D:
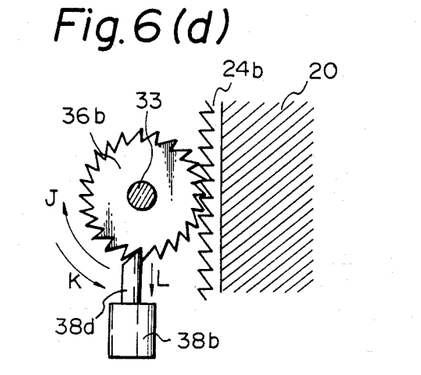
Figure 6E:
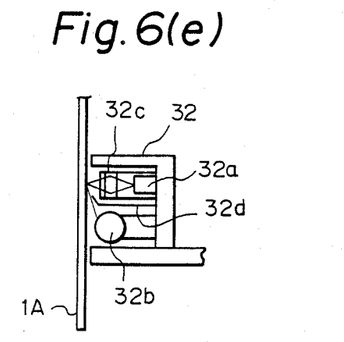
Figure 6F:
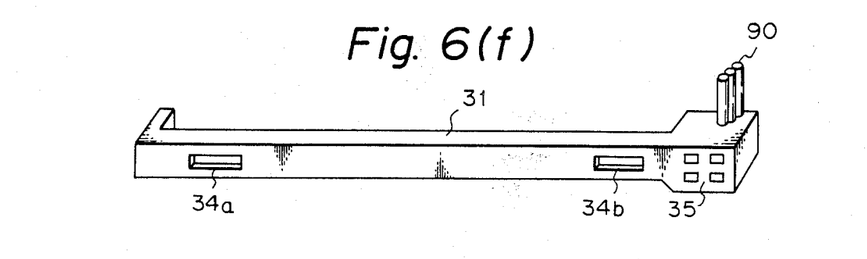

The scanning unit 30 is arranged during writing operation, upwardly of the frame 20 as shown in FIG. 1. Namely, the scanning unit 30 is held at the upper position of the frame 20, since the gears 36a, 36b provided in the interior of the scanning unit are engaged respectively with the rack teeth 24a, 24b of the frame 20, and furthermore are biased thereagainst, together with the synchronization shaft 33, by the spiral spring 37. On the other hand, during a copying (monitoring operation, a writer first inserts his fingers into the handgrip holes 34a, 34b and pushes down the scanning unit 30 against the force of spiral spring 37 to move unit 30 to a prescribed position (a position where the guide plates 39a, 39b of the scanning unit 30 contact the respective projections 20c, 20d). The gear 36b, the stopper 38d of the solenoid 38b, and the rack tooth 24 then are arranged as shown in FIG. 6(d). Namely, the stopper 38d is engaged with a tooth of the gear 36b tended to be rotated in the direction of arrow J due to the bias of the spiral spring 37, thus preventing the gear 36b from being so rotated. Thus, the scanning unit 30 is stopped at that position owing to the engagement of the gear 36b with the stopper 38d independently of the bias of the spiral spring 37. Thereupon, when the gear 36b is rotated in the direction of arrow K, an inclined portion of the tooth of gear 36b is allowed to push against an inclined portion of the stopper 38d and hence the stopper 38d is pushed in the direction of arrow L. Thus, the gear 36b is rotatable in the direction of arrow K in spite of the engagement thereof with the stopper 38d. As a result, the gear 36b is not prevented by the stopper 38d from moving upon the scanning unit 30 moving downwardly. The scanning unit 30 is moved on the frame 20 from the lower end to upper end thereof by the restoring force of the spiral spring 37 by energizing, when the scanning unit 30 is positioned at the lower prescribed position, the solenoid 38b to move the stopper 38d in the direction of arrow L to release the engagement of the stopper 38d with the gear 36b. During this movement of the scanning unit 30, the writing surfaces 1A, 1A' are illuminated with light from the light source 32b housed in the read unit 32 as shown in FIG. 6(e), and reflected light is focused onto the photoelectric conversion sensor 32a via a rod lens 32C to scan the writing surfaces 1A, 1A'. Shown in 32d in FIG. 6(e) is an optional shielding plate for blocking the light from the light source 32b to prevent such light from directly impinging on the photoelectric conversion sensor 32a. The scanning unit 30, after being moved to the upper end of the frame 20, finally returns to the original position shown in FIG. 1. Furthermore, the scanning frame 30 may have an ink marker 90 as shown in FIG. 6(f).

Figure 7A:
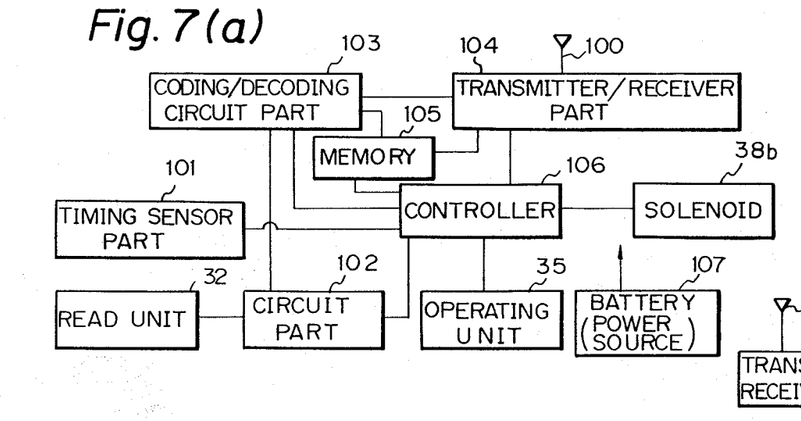
FIGS. 7(a) and 7(b) are block diagrams illustrating an electric control system in an embodiment of the electronic print board apparatus of the present invention.

The electric control system disposed in the scanning unit 30 now will be described with reference to FIG. 7(a), wherein numeral 101 is a timing sensor part composed of timing sensor 38a and mark sensor 38c shown in FIG. 6(a). Numeral 102 is a circuit part for processing a read signal from the read unit 32. Numeral 103 is a coding/decoding circuit part for coding a signal from the circuit part 102 while decoding a signal received from the monitor printer shown in FIG. 7(b). Numeral 104 is a transmitter/receiver part for transmitting a signal to the monitor printer and receiving a signal therefrom. Numeral 105 is a memory for storing respective signals during transmitting and receiving operations. Numeral 106 is a controller for controlling the respective illustrated parts. Numeral 107 is a battery power source serving to supply power to each illustrated part and is chargeable by connection thereof to an external charging unit (not shown) via a charging terminal 91 shown in FIG. 6(a).

Figure 7B:
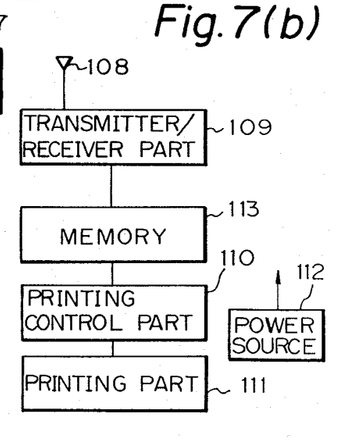

FIG. 7(b) is a block diagram illustrating the electric control system of the monitor printer. The monitor printer is housed, as described above, in an independent casing different from the frame 20 shown in FIG. 1. Designated at 108 is an antenna, 109 is a transmitter/receiver part for communicating with the electric control system of the scanning unit 30, 111 is a printing part, 110 is a printing controller for controlling the printing part 111, 112 is a commercial power source for supplying power to the respective parts, and 113 is a memory for storing respective signals during transmitting and receiving operations.

Figure 3:
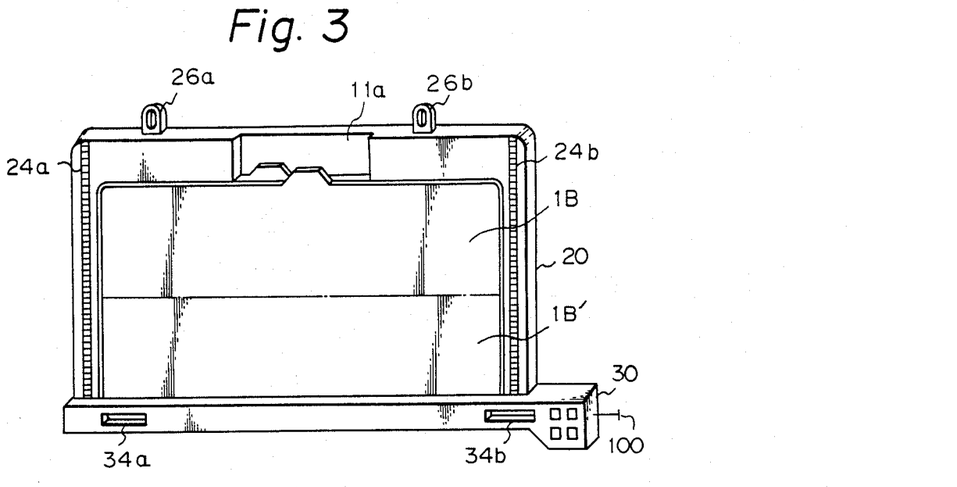
FIG. 3 is a similar view illustrating the movement of a scanning unit shown in FIG. 1.

The operation of the present invention now will be described. A blackboard unit according to the present invention is fixedly mounted on a wall by hooking suspension hooks 26a, 26b provided on the upper end of the frame 20 on hanger fittings 27a, 27b fixed on the wall as shown in FIG. 1. The writing surface is assumed to be 1A, 1A' at first. The changeover of the writing surface from 1A, 1A' to 1B, 1B' can be achieved by pulling the hook portion 10a outwardly as shown in FIG. 2. This operation is as described previously. As a result, the writing surface changes to 1B, 1B' as shown in FIG. 3. When, after character data is written on the writing surface 1B, 1B', any copy of this surface is required, the scanning uit 30 is first pulled down from the position thereof shown in FIG. 1 to the position of FIG. 3 by inserting the operator's fingers into the handgrip holes 34a, 34b, during which the gears 36a, 36b respectively engaged with the rack teeth 24a, 24b on the frame 20 are rotated to tension or wind the spiral spring 37 disposed at the end of the synchronization shaft 33. Thereupon, the scanning unit 30 is maintained at the position of FIG. 3 by permitting the gear 36b to be locked by the solenoid 38b. Then, the switches "power on", "monitor on", and "number of copies set" on the operating part 35 are depressed in order. With the "power on" switch being depressed the power source for the elctric control system in the scanning unit 30 is turned on, and with the "monitor on" switch being depressed a signal is transmitted from the transmitter/receiver part 104 and antenna 100 in the scanning unit 30 to the antenna 108 and the transmitter/receiver part 109 in the monitor printer to turn on the power source for the electric control system in the monitor printer. In addition, with the "number of copies set" switch being depressed the desired number of copies is designated. Although the "number of copies set" switch is arranged such that the number of times of successive depressions thereof corresponds to the number of copies, it is not limited thereto. Namely, this switch may be arranged such that the designation is effected by providing a plurality of switches as the "number of copies set" switch and selectively depressing a switch corresponding to the desired number of copies.

After confirming that the three switches on the operating part 35 have been depressed as described above, the "start" switch is finally depressed. In addition, these switches may be arranged such that lamps, etc., are provided in the interiors of the respective switches, any of which lamps being lit corresponding to the switch being depressed for confirmation of the switch being on. With the "start" switch being depressed, the controller 106 of FIG. 7(a) actuates the solenoid 38b. With the lock being released, the gears 36a, 36b are rotated in the direction of arrow J in FIG. 6(d) in engagement with the rack teeth 24a, 24b on the frame 20 by the restoring force of the tensioned or wound spiral spring 37, thereby moving the scanning unit 30 upwardly. When the read operation of the timing sensor part 101 is started by depressing the "start" switch to move the scanning unit 30 upwardly, the mark sensor 38c shown in FIG. 6(a) reads the start mark 25b shown in FIG. 4, whereupon the read unit 32 starts to read the writing surface. The read unit 32 optically scans the writing surfaces 1B, 1B' by means of the photoelectric conversion sensor 32a, etc., during a time based on an electric signal from gear 36b. The electric signal from the read unit 32 is processed in the circuit part 102 of FIG. 7(a) and coded in the coding/decoding circuit part 103, and thereafter transmitted to the monitor printer shown in FIG. 7(b) via the transmitter/receiver part 104 and the antenna 100. Any image information transmitted from the scanning unit 30 via the antenna 108 and the transmitter/receiver part 109 is received by the monitor printer and stored in the memoray 113, and thereafter is printed by the printing part 111 under the control of the printing control part 110. When the mark sensor 38c detects the end mark 25a shown in FIG. 4, the controller 106 shown in FIG. 7(a) interrupts the actuation of the solenoid 38b to lock the gear 36b, thereby stopping the upward movement of the scanning frame 30. Moreover, the designation of the number of copies to be printed by the depression of the "number of copies set" switch is transmitted to the transmitter/receiver part 109 of the monitor printer in a manner similar to the transmission of the above image information. The printing control part 110 reads the image information from the memory 113 based on the number-of-copies information, and controls the printing part 111 to effect printing corresponding to the designated number of copies.

The present invention permits various modifications without being limited to the embodiment described above. For example, the embodiment described above is adapted to employ the restoring force of the spiral spring 37 for the movement of the scanning unit 30, but the scanning unit may be moved manually or by an electric motor. In addition, although the above embodiment provides the writing surface in the form of a pair of flat plates, e.g., 40c and 40d, joined at the point F, rotatably movable in the direction of arrow G to change the writing surface, it would be possible to arrange each plate independently without joining adjacent plates at the point F, to treat both the front and back surfaces of each flat plate to be writable, and to rotate each single flat plate so treated in the direction of arrow G. Furthermore, although the illustrated embodiment provides the stacked flat plate assemblies 40 spaced vertically at the upper and lower parts of the frame 20, such that the flat plates are rotated vertically, it would be possible to arrange the stacked flat plates on the right and left sides of the frame such that the flat plates are rotatable to the right and left to change the writing surface.

Although a preferred embodiment has been shown and described, it should be understood that many other changes and modifications may be made thereto without departing from the scope of the invention.

What is claimed is:

1. An electronic print board apparatus comprising:
   (a) a writing unit having a writable/erasable writing surface;
   (b) a frame housing and supporting said writing unit;
   (c) a scanning unit supported movably on said frame for optically scanning said writing surface in a prescribed direction and for thereby issuing an electric signal indicative of information read from said writing surface;
   (d) a printing unit for printing the read information on a recording medium in conformity with said electric signal;
   (e) said writing unit comprising a plurality of flat plates having surfaces capable of being written on, said plurality of flat plates being arranged in two stacks within respective portions of the interior of said frame, each said stack extending outwardly from said interior of said frame;
   (f) said writing surface being formed by the two said flat plates located on the outermost front row of said two stacks; and
   (g) each said flat plate of said plurality of flat plates being rotatable, when located in said front row, around a boundary axis dividing said two stacks, to move from one said stack to the other of said two stacks.

2. An electronic print board apparatus according to claim 1, wherein each said stack of flat plates is movable between the exterior to said interior of said frame.

3. An electronic print board apparatus according to claim 1, further comprising biasing means for moving each said stack of flat plates from said interior of said frame outwardly thereof.

4. An electronic print board apparatus according to claim 1, wherein each said plurality of flat plates has a pivot engaged in a groove provided in said frame, said flat plate being rotatable and movable about said pivot.

5. An electronic print board according to claim 1, wherein adjacent of said plurality of first plates are connected by respective magnets.

6. An electronic print board apparatus comprising:
   (a) a writing unit having a writable/erasable writing surface;
   (b) a frame for housing and supporting said writing unit;
   (c) a scanning unit supported movably on said frame for optically scanning said writing surface in a prescribed direction and issuing an electric signal indicative of information read from said writing surface; and
   (d) a printing unit for printing the read information on a recording medium in conformity with said electric signal;
   (e) said scanning unit including:
      (A) an operating member for providing a prescribed designation;
      (B) drive means for moving said scanning unit over said surface in said prescribed direction;
      (C) a read unit composed of a light source for illuminating said writing surface with light and a sensor for converting reflected light from said writing surface to said electric signal;
      (D) synchronization means for synchronizing the scanning of said writing surface by said read unit with the speed of movement of said scanning unit; and
      (E) a battery for supplying power to said respective elements of said scanning unit.

7. An electric print board apparatus according to claim 6, wherein said drive means includes gears rotatably engaging with rack teeth provided on said frame, and a power source for rotating said gears to move said scanning unit in said prescribed direction.

8. An electronic print board apparatus according to claim 7, wherein said power source comprises a spiral spring wound by manually moving said scanning unit in a direction opposite to said prescribed direction.

9. An electric print board apparatus according to claim 8, further comprising rotation lock and releasing means for engaging with at least one of said gears to prevent it from being rotated, and for releasing said engagement with said gear to enable rotation thereof.

10. An electronic print board apparatus according to claim 7, wherein said synchronization means comprises means for optically reading the teeth of at least one of said rotating gears upon the movement of the scanning unit in said prescribed direction and for synchronizing said scanning of said writing surface by said read unit with said moving speed of said scanning unit as a function said reading of said teeth.

11. An electronic print board apparatus according to claim 6, wherein said scanning unit is detachable from said frame.

12. An electronic print board apparatus comprising:
   (a) a writing unit having a writable/erasable writing surface;
   (b) a frame for housing and supporting said writing unit;
   (c) a scanning unit supported movably on said frame for optically scanning said writing surface in a prescribed direction and for thereby issuing an electric signal indicative of information read from said writing surface; and
   (d) a printing unit for printing the read information on a recording medium in conformity with said electric signal;
   (e) said scanning unit including:
      (A) an operating member for providing a prescribed designation;
      (B) drive means for moving said scanning unit over said writing surface in said prescribed direction;
      (C) a read unit composed of a light source for illuminating said writing surface with light and a sensor for converting reflected light from said writing surface to said electric signal;
      (D) synchronization means for synchronizing the scanning of said writing surface by said read unit with the speed of movement of said scanning unit;

(E) a battery for supplying power to said respective elements of said scanning unit; and (F) transmitting means for transmitting the read information from said read unit in the form of radio signals;

(f) said printing unit including receiving means for receiving said information in the form of radio signals transmitted from said scanning unit.

* * * * *